(12) United States Patent
Ardissono et al.

(10) Patent No.: US 7,114,103 B2
(45) Date of Patent: Sep. 26, 2006

(54) SYSTEM FOR FINDING AND REMOVING ERRORS USING A SERIAL BUS FOR A MICROCONTROLLER

(75) Inventors: Giacomo Ardissono, Salassa (IT); Domenico Pedrali, Lomagna (IT); Vittorio Peduto, Ivrea (IT)

(73) Assignee: STMicroelectronics SRL, Agrate Brianza (IT)

( * ) Notice: Subject to any disclaimer, the term of this patent is extended or adjusted under 35 U.S.C. 154(b) by 660 days.

(21) Appl. No.: 10/328,671

(22) Filed: Dec. 23, 2002

(65) Prior Publication Data

US 2003/0126507 A1 Jul. 3, 2003

(30) Foreign Application Priority Data

Dec. 27, 2001 (EP) .................................. 01830811

(51) Int. Cl.
*G06F 11/00* (2006.01)
(52) U.S. Cl. ............................... 714/38; 714/30; 714/31
(58) Field of Classification Search ..................... None
See application file for complete search history.

(56) References Cited

U.S. PATENT DOCUMENTS

| 5,627,784 | A  | * | 5/1997  | Roohparvar ........... 365/189.01 |
| 5,710,934 | A  | * | 1/1998  | Bona et al. .................. 714/724 |
| 6,150,296 | A  | * | 11/2000 | Heinerman et al. ......... 502/152 |
| 6,194,345 | B1 | * | 2/2001  | Mangnus et al. ........... 502/224 |
| 6,350,715 | B1 | * | 2/2002  | Schuurhuis .................. 502/134 |
| 6,611,889 | B1 | * | 8/2003  | Otsuka ........................ 710/100 |
| 6,877,114 | B1 | * | 4/2005  | Allen et al. .................... 714/45 |
| 6,954,878 | B1 | * | 10/2005 | Kudo ........................... 714/30 |
| 2002/0108006 | A1 | * | 8/2002 | Snyder ........................ 710/100 |
| 2002/0133794 | A1 | * | 9/2002 | Kanapathippillai et al. .... 716/4 |
| 2003/0217306 | A1 | * | 11/2003 | Harthcock et al. ............ 714/30 |

FOREIGN PATENT DOCUMENTS

| EP | 0 840 220 A1 | 6/1998 |
| JP | 04323489     | 3/1992 |

OTHER PUBLICATIONS www.pcwebopaedia.com/TERM/M/memory.html.*
http://foldoc.org/?flash+memory.*

* cited by examiner

*Primary Examiner*—Robert Beausoliel
*Assistant Examiner*—Yolanda L. Wilson
(74) *Attorney, Agent, or Firm*—Hogan & Hartson L.L.P.

(57) ABSTRACT

The present invention relates a system adapted to localize and remove software type errors comprising a microcontroller (10) and storing means (11), said microcontroller (10) being connected to said storing means (11) by a serial type bus (12), characterized in that said system comprises a first (20) and a second (14) converter, said first converter (20) being inside said microcontroller (10) and said second converter (14) being inside said storing means (11), said first (20) and second (14) converter being connected by means of said serial type bus (12), said storing means (11) being outside said microcontroller (10), said microcontroller (10) adapted to transmit and to receive data with said storing means (11) by means of said first (20) and second (14) converter.

10 Claims, 3 Drawing Sheets

SYSTEM FOR FINDING AND REMOVING ERRORS USING A SERIAL BUS FOR A MICROCONTROLLER

DESCRIPTION

The present invention relates to an error localization and removal system using a serial bus for a microcontroller, particularly to a localization and removal system for software errors present in a microprocessor.

It is known that, when a microprocessor executes a certain program, it can happen that the execution flow of said program, in the order deduced by its control structures and by the values assumed by the variables, can be interrupted, for reasons that do not depend directly on the state of the process in execution.

What heretofore described is the typical scenario that it is possible to obtain when a processor is sensible to the events, either said events correspond to errors, or to exceptions, or to communications with and among peripheral devices, or to control of processes, or to other similar eventualities.

In order to correct said events and/or errors, software programs, called debugger, are used, which are able to localize and remove said communication events and/or errors with and among the peripheral devices, or other similar eventualities.

It is also known that as the minituatirization process increases, all the devices that concur to implement a controller have been integrated inside a single chip, giving origin to a computer on chip, also called microcontroller.

A microcontroller is, therefore, a single integrated circuit that contains all the necessary elements adapted to implement a complete system of elaboration, that is: a Central Process Unit CPU, one or more memories, a clock oscillator and I/O communication interfaces.

Particularly, the memories can be of RAM (Random Access Memory) type, or ROM (Read Only Memory) type, or also EPROM (Electrical Programmable Memory) type, or EEPROM (Erasable EPROM) type, the content of which can be modified meanwhile the debugging program is working.

Inside said microcontroller serial type units are also present, thanks to which the CPU can transfer information (the bits) in a serial way to the external devices. The use of a serial format requires a lower number of I/O pins than a parallel format for the execution of the communication functions. The serial transmission has the advantage to be more economic but it has also the drawback to be slower, and finally said serial transmission can be also performed both in a synchronous and in asynchronous way.

The modern technology, however, allows to use serial transmissions having a high bit rate and a high noise immunity.

In the microcontrollers, a fundamental characteristic both for the complexity of the situations that said microcontrollers nowadays has to resolve, such as in the industrial control, and because applications are asserting that require processors that are not provided necessarily with a lot of computational power, but with as short as possible response time, it is to consider in a way as precise as possible everything that can happen during the execution of a program, so as it is possible to adopt the most efficient techniques and procedures to manage the occurrence of the events and/or errors that can be create.

The problem to be solved in the known microcontroller systems is just due to the establishment of the correctness of the programs stored in the same microcontroller.

In fact, first of all it is necessary projecting and therefore implementing a first version of the microcontroller thanks to which it is possible to acquire from outside said debugger programs and, when necessary, storing them in a added memory. In this way, it is possible to test everything that can happen during the execution of a definitive program. During this first phase it is therefore possible adopting all the most efficient techniques and procedures, modifying opportunely and storing said debugger programs, when necessary, in said memory until the simulation of the definitive program is able to manage the events and/or the errors that can arise.

In function of this working simulation, a second version of the microcontroller will be projected and therefore implemented, so that in this second implementation a further memory will be added in replacement of the previous one. In such further memory the definitive program will be stored.

All this states high projecting and implementation costs, but a more remarkable drawback is that if the definitive program is not perfectly working, the test phase has to be repeated with further increase of projecting and implementation costs.

In view of the state of the art described, it is an object of the present invention to perform a debugging operation without the help of an implemented ad hoc internal memory.

According to the present invention, such object is achieved by a system adapted to localize and remove software type errors comprising a microcontroller and storing means, said microcontroller being connected to said storing means by a serial type bus, characterized in that said system comprises a first and a second converter, said first converter being inside said microcontroller and said second converter being inside said storing means, said first and second converter being connected by means of said serial type bus, said storing means being outside said microcontroller, said microcontroller adapted to transmit and to receive data with said storing means by means of said first and second converter.

Thanks to the present invention it is possible making a remarkable saving of projecting and implementing costs.

Moreover it is possible making a system able to test a microcontroller without the necessity of storing the debug software in a memory inside said microcontroller.

Moreover thanks to the present invention if the definitive program is not perfectly efficient or it needs further additional characteristics, it is possible making again the test phase without the necessity of implementing again the microcontroller.

By using such a system, it is also possible testing directly the final software of the microprocessor.

The features and the advantages of the present invention will be made evident by the following detailed description of an embodiment thereof, which is illustrated as not limiting example in the annexed drawings, wherein.

Figure 1:
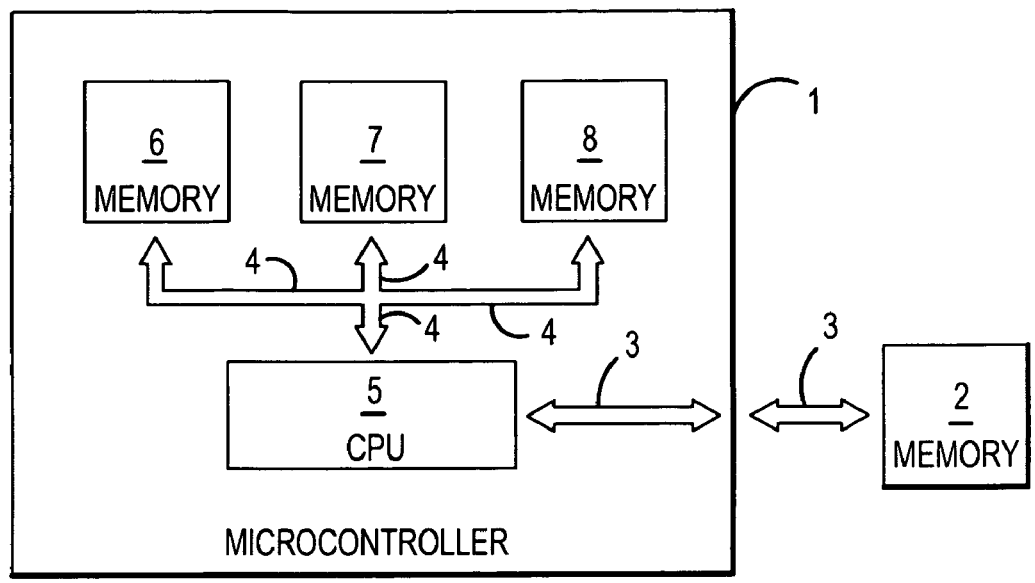
FIG. 1 shows a necessary hardware architecture of a microcontroller for storing a test software inside a memory, according to the prior art.

In FIG. 1 a necessary hardware architecture of a microcontroller for storing a test software inside a memory, according to the prior art, is shown.

In fact, in such a FIG. 1, there is depicted a microcontroller 1 connected externally to a memory 2 by means of a serial type bus 3, whilst internally to said microprocessor 1 there is a plurality of devices connected each other by means of a parallel type bus 4.

Such a memory 2, by way of example, is a flash type non volatile memory.

Such devices are a CPU (Central Processing Unit) 5, a first 6, a second 7 and a third 8 memory block.

Particularly, the CPU 5 comprises also other peripheral devices (not shown in FIG. 1), the first memory block 6 is a RAM (Random Access Memory), whilst the third memory block 8 is a ROM (Read Only Memory).

The second memory block 7 is a Debug Internal Memory (DIM), wherein is stored a program able to localize particular malfunctions, as hereinafter explained.

Such debug program is initially stored in said non volatile memory 2 extern at said microcontroller 1.

In such microcontroller systems 1, a test of the devices 5–7 is performed by means of said debug program, initially stored in said memory 2 and then transferred into the DIM 7.

Therefore, first of all, it is necessary projecting and then implementing in a first version of the microcontroller, by means of which it is possible to acquire from outside said debug programs and when necessary to store them in a added memory. Such an operation is performed by the serial bus 3 between the external memory 2 and the CPU 5 of the microcontroller 1.

The techniques by means of which the transfer of the debug program is performed are well known to a person skilled in the art.

Once such a debug program is stored in said DIM 7, the CPU 5 is able to test everything can happen during the execution of a definitive program.

At the end of this step, in function of what happened, it is possible to intervene on said debug program, adopting, therefore, all the techniques and the procedures able to modify opportunely such debug program. Such new version has to be stored in said DIM 7 by drawing from said external memory 2.

Such modifying and storing operations have to be repeated until the debug programs, used by said CPU 5, are free from errors. At the end of this simulation step, a second version of the microcontroller will be projected and therefore will be implemented, so that in this second version there is not the internal debug memory 7, as shown in FIG. 2.

Figure 2:
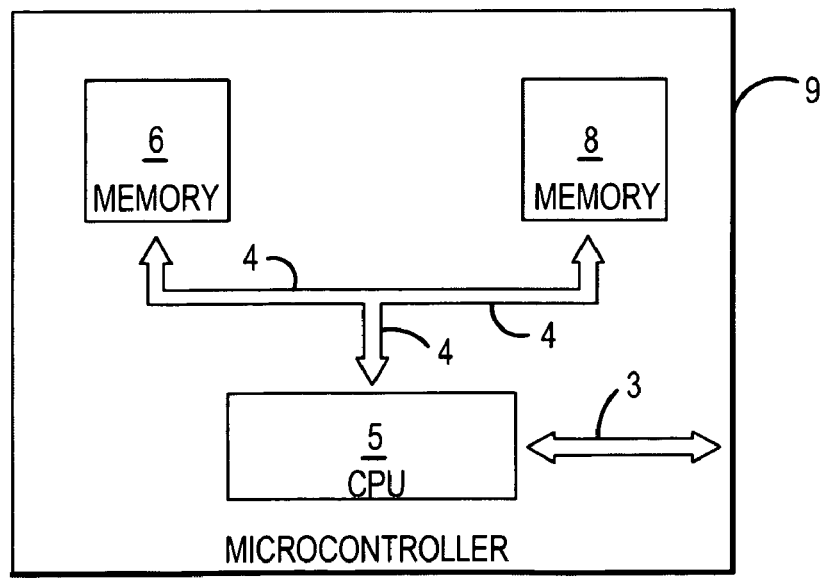
FIG. 2 shows the same hardware architecture of FIG. 1, once the test phase is ended, according to the prior art.

In such a FIG. 2, a microcontroller 9 equal to that shown in FIG. 1 is noted, and equal identification numbers correspond to equal elements, exception being made for the memory DIM 7, that it is not present in said microcontroller 9.

Moreover, there is not the external memory 2 because the definitive program, deduced by the heretofore described simulations, is now stored in the memory ROM 8.

The microcontroller 9, thus depicted, has been therefore projected newly with respect to the microcontroller 1. This is a cost both in time and in money.

However, if the program now stored in the ROM 8 shows some errors, for reasons not estimated during the test step, the flow of the instructions in execution can be interrupted with the imaginable consequences.

This situation forces to repeat the test steps and the storing steps in the DIM 7, that is coming back to a microcontroller as that described in the FIG. 1.

This is a remarkable cost both in time and in money.

Figure 3:
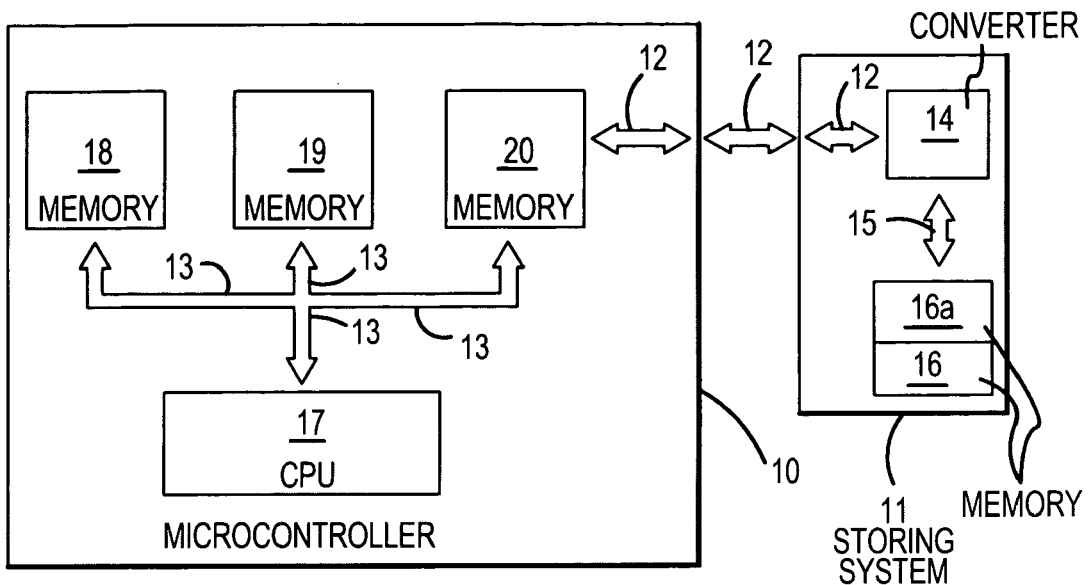
FIG. 3 shows a necessary hardware architecture of a microcontroller for storing a test software inside a memory, according to the present invention.

All this is avoided by means of a hardware architecture of a microcontroller useful for the test of said microcontroller, according to the present invention as shown in FIG. 3.

In FIG. 3 a microcontroller 10 connected externally to a storing system 11 by means of a serial type bus 12 is shown, whilst internally to said microcontroller 10 there is a plurality of devices 17–20, connected each other by means of a parallel type bus 13.

The serial type bus 12 is, by way of example, a Low Voltage Differential Signaling (LVDS) bus.

The storing system 11 is composed by a slave converter 14 connected by means of another parallel type bus 15 to a memory 16.

Particularly the bus 15 has technical characteristic equal to the bus 13.

The memory 16 is by way of example a flash type non volatile memory.

The non volatile memory 16 can also have a portion designated to implement as row memory 16a, this latter connected to the non volatile memory 16 by means of a parallel type bus (not shown in FIG. 3), so as to guarantee the most communication band width between said two portions, being the access time of the row memory 16a faster than the access time of the non volatile memory 16.

The microcontroller 10 foresees inside a plurality of devices such as by way of example, a Central Processing Unit (CPU) 17, a first 18 and a second 19 memory block and a host converter 20.

The host converter 20 and the slave converter 14 are to be considered as peripheral devices of the microcontroller 10.

The embodiment of said slave 14 and host 20 converters is known to a skilled person.

Particularly, the CPU 17 includes also further peripheral device, such as, by way of example, particular peripheral devices at which the microcontroller has to be applied, otherwise the control logic expressly implemented by the final user.

The first memory block 18 is a Random Access Memory (RAM), whilst the second memory block 19 is a Read Only Memory (ROM).

As heretofore explained for testing the way of working of a microcontroller is necessary to use a debug program.

According to the present invention, the debug program is resident in the non volatile memory 16 of the storing system 11, and such a debug program in cooperating with the CPU 17, verifies the plurality of devices 17–19 of the microcontroller 10.

In other words, it is therefore necessary to project and therefore to implement a unique version of the microcontroller 10 by means of which it is possible to acquire from outside such debug programs and/or the final software, and such an operation is performed by means of the serial connection 12 existing between the storing system 11 and the CPU 17 of the microcontroller 10, and to perform such debug program by means of the CPU 17. When the test step of the program is terminated, the same will be stored in the integrated memory ROM 19. This operation has a lower cost than the complete remaking of the microcontroller.

Therefore, it is as if the debug program has been stored internally the microcontroller 10, but conversely the microcontroller 10 exchanges data between the CPU 17 and the extern non volatile memory 16.

This operation of execution of the program is possible thanks to the presence of the host converter 20 and the respective slave converter 14, each other connected by means of the serial bus 12.

The CPU 17 is therefore able to simulate everything can happen during the execution of a definitive program, without storing in an internal memory thereof the debug program.

This is possible thanks to the serial bus 12, that is a high rate transmission connection.

Particularly, the serial bus 12 must have the characteristics of high frequency way of working, by way of example 2.5 GHz, because the maximum frequency by which the CPU 17 can connect itself to the memory 16 depends on this value, and it must have, moreover, a high noise immunity, because the serial bus 12 will be cabled on the printed circuit with other signals in function of specific embodiments, and finally it must have a low implementing cost because in the microcontroller 10 this serial connection 12, and the respective connection and supply pins (not shown in FIG. 3) will no longer be used.

A type of bus corresponding to said requirements is, by way of example, the LVDS bus, that is implemented by means of a five different transmitting and/or receiving lines, of which two dedicated to the transmission and three dedicated to the reception.

Particularly, one of the two transmitting lines is dedicated to the transmission of the transmission clock signal, while the other is dedicated to transfer the data from the CPU 17 to the non volatile memory 16 and/or to the row memory 16a. Said data can be, by way of example, the request of data transfer from the non volatile memory 16 to the CPU 17 or the transmit of the commands from the CPU 17 to the slave converter 14.

Particularly, one of three receiving lines is dedicated to the receiving clock signal transmission, and the other two lines are dedicated to the transfer of data from the non volatile memory 16 and/or the row memory 16a to the CPU 17, that is to the transfer of the debug program and/or the final software.

Figure 5:
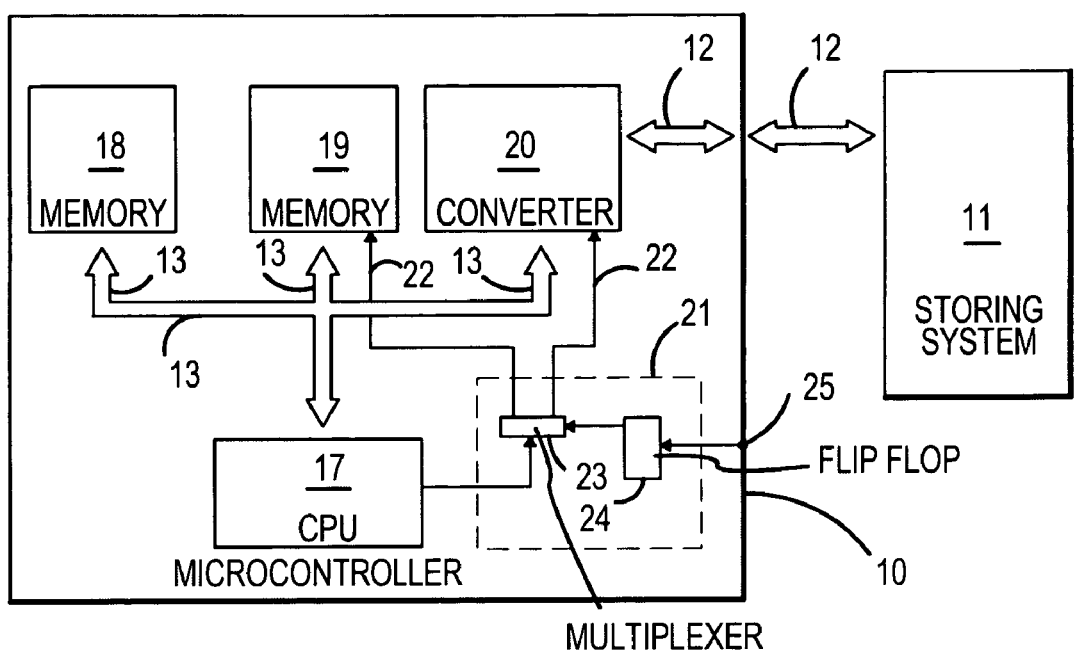
FIG. 5 shows a second embodiment of the present invention.

At the end of this test step the definitive program, deduced from the heretofore described simulations in the ROM memory 19 and in the microcontroller 10 is, therefore, ready to be used in the applications for which it is projected, by assuming the circuit embodiment shown in FIG. 5.

Figure 4:
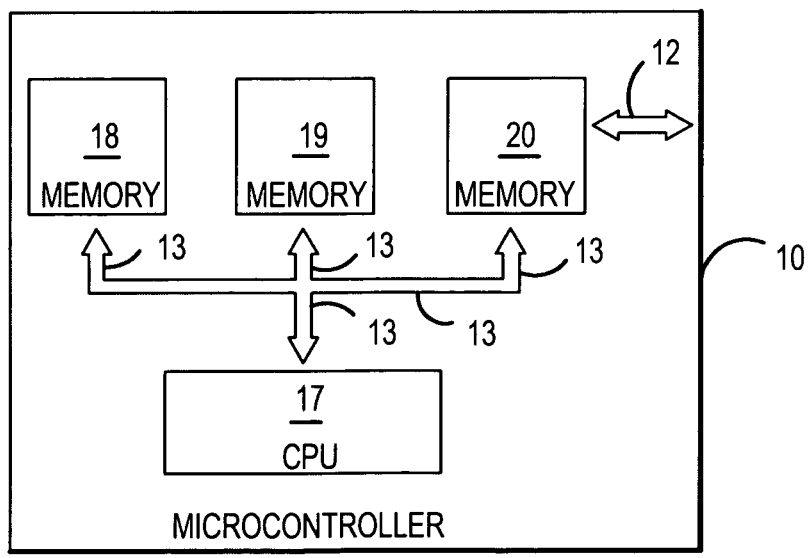
FIG. 4 shows the same hardware architecture of FIG. 3, once the test phase is ended, according to the present invention.

In such a FIG. 4, the definitive level of the microcontroller 10 wherein it is not necessary the presence of the non volatile memory 11 is shown and moreover in said microcontroller 10 the unique change with the respect to what shown in FIG. 3 is the implementing mask of the memory ROM 19, so as to be able to store the last version of the operating program.

As heretofore described, the cost of this operation is lower than the remaking cost of the microcontroller. Obviously, after this step, it is not necessary the presence of the external non volatile memory 11 a part of in the situation of further problems in the final program.

Further advantage of the present invention arises also in the case of the program now stored in the ROM 19 shows errors or system blocks, for reasons not evaluated in the test step.

In fact in such a situation, referring to the configuration of FIG. 5, to the debug step with the debug program contained in the external storing means 11 has to come back and therefore, at the end of the debug step, the new program is stored in the internal memory ROM 19.

Such a FIG. 5 shows a circuit embodiment wherein a selector 21 connected to said plurality of devices 17-20 and to an external pin 25 is shown.

The selector 21 is composed by a multiplexer device 23 connected directly to a flip-flop 24.

The multiplexer 23 is connected by the communication line 22 to the CPU 17, to the ROM 19 and to the host converter 20, so as to select one of these devices 19 or 20.

The flip-flop 24 has the input connected to the external pin 25 and the output connected, as selector input, to the multiplexer 23.

In function of the value present on the pin 25 the software present in the ROM 19 or that present in the external memory 11 is executed.

In this way it is not necessary to implement a new version of the microcontroller with a new internal memory ROM during the debug step, but said new software is stored in said non volatile memory 16 and successively connected to the microcontroller 10 by means of the serial line 12.

In this way the RAM area 18 is used only as data area to be used during the normal way of working of the microcontroller 10.

This is a remarkable advantage of cost both in time and in money.

The invention claimed is:

1. A system adapted to localize and remove software type errors comprising:
    a microcontroller and storing means, said microcontroller being coupled to said storing means by a serial type bus and a first and a second converter, said first converter being inside said microcontroller and said second converter being inside said storing means, said first and second converters being coupled by means of said serial type bus, said storing means being outside said microcontroller, and said microcontroller adapted to transmit and receive data with said storing means by means of said first and second converters, wherein said second converter is coupled to a storing device by a first parallel type connecting bus, wherein said storing device comprises a row memory portion, and wherein said storing device and said row memory portion are coupled through a second parallel type connecting bus.

2. A system according to claim 1, wherein said first converter is coupled by means of a third parallel type bus to a plurality of peripheral devices, said peripheral devices being coupled to each other by means of said third parallel type bus.

3. A system according to claim 2, wherein said peripheral devices comprise a first and a second memory block, and a Central Processing Unit.

4. A system according to claim 3, wherein said microcontroller comprises a selector coupled to said second converter, to said second memory block and to said Central Processing Unit, for receiving input data coming from an input pin, said selector being adapted to select between second memory block and said storing device as a function of the data of said input pin.

5. A system according to claim 4, wherein said selector comprises a multiplexer and a flip-flop, said multiplexer is coupled to said flip-flop, and is adapted to select between said second memory block and said storing device, as a function of the state of said flip-flop and of said Central Processing Unit.

6. The system according to claim 2 wherein said first, second and third parallel buses are connecting buses having the same technical characteristics.

7. A system according to claim 3 wherein said second memory block comprises a Read Only Memory (ROM).

8. A system according to claim 1 wherein said transmitted data from said microcontroller are data adapted to control the interaction between said Central Processing Unit and said first and second memory blocks and said first converter.

9. A system according to claim 1 wherein said storing device comprises a flash type non volatile memory.

10. A system according to claim 1 wherein said first memory block comprises a Random Access Memory (RAM).

* * * * *